(12) United States Patent
Erban et al.

(10) Patent No.: US 11,459,087 B2
(45) Date of Patent: Oct. 4, 2022

(54) LEADING-EDGE DEVICE FOR AN AIRCRAFT

(71) Applicant: Airbus Operations GmbH, Hamburg (DE)

(72) Inventors: Marcus Erban, Hamburg (DE); Martin Fees, Hamburg (DE); Stefan Bensmann, Hamburg (DE)

(*) Notice: Subject to any disclaimer, the term of this patent is extended or adjusted under 35 U.S.C. 154(b) by 188 days.

(21) Appl. No.: 16/861,714

(22) Filed: Apr. 29, 2020

(65) Prior Publication Data
US 2020/0346738 A1 Nov. 5, 2020

(30) Foreign Application Priority Data
Apr. 30, 2019 (DE) .......................... 102019111135.8

(51) Int. Cl.
| | |
|---|---|
| *B64C 9/24* | (2006.01) |
| *B64D 13/06* | (2006.01) |
| *B64D 15/04* | (2006.01) |
| *B64D 27/18* | (2006.01) |

(52) U.S. Cl.
CPC .............. *B64C 9/24* (2013.01); *B64D 13/06* (2013.01); *B64D 15/04* (2013.01); *B64D 27/18* (2013.01); *B64D 2013/0607* (2013.01); *B64D 2013/0618* (2013.01)

(58) Field of Classification Search
CPC .. B64C 9/24; B64D 13/06; B64D 2013/0607; B64D 2013/0618; B64D 15/00; B64D 15/02; B64D 15/04
See application file for complete search history.

(56) References Cited

U.S. PATENT DOCUMENTS

| | | | |
|---|---|---|---|
| 2,470,128 A | 5/1949 | Barrick et al. | |
| 5,011,098 A * | 4/1991 | McLaren | B64D 15/04 244/134 B |
| 7,954,753 B2 | 6/2011 | Hoffjann et al. | |
| 8,840,056 B2 | 9/2014 | Vauchel et al. | |

(Continued)

FOREIGN PATENT DOCUMENTS

| | | |
|---|---|---|
| DE | 102004058430 B4 | 11/2009 |
| DE | 102008019146 A1 | 11/2009 |

(Continued)

OTHER PUBLICATIONS

German Search Report; priority document.

*Primary Examiner* — Timothy D Collins
*Assistant Examiner* — Eric Acosta
(74) *Attorney, Agent, or Firm* — Greer, Burns & Crain, Ltd.

(57) ABSTRACT

A leading-edge device for an aircraft, the device comprising a flow body having a front skin, a back skin, a spar and an air inlet. The front skin is curved around a spanwise axis to form a bottom section and a top section.

A leading edge of the flow body is arranged between the bottom section and the top section. The spar extends from the bottom section to the top section. The front skin, the back skin and the spar enclose at least one air chamber that is in fluid communication with the air inlet. An outlet portion is arranged at least directly adjacent to the bottom section of the front skin. The outlet portion comprises a plurality of air outlets for letting air from the at least one air chamber exhaust through the air outlets.

13 Claims, 6 Drawing Sheets

(56) References Cited

U.S. PATENT DOCUMENTS

| | | |
|---|---|---|
| 8,857,767 B2 | 10/2014 | Stotle et al. |
| 9,010,084 B2 | 4/2015 | Chelin et al. |
| 9,390,704 B2 | 7/2016 | Hurlin et al. |
| 9,896,190 B1 | 2/2018 | Amorosi et al. |

FOREIGN PATENT DOCUMENTS

| | | |
|---|---|---|
| EP | 0376371 A2 | 7/1990 |
| WO | 2010012899 A2 | 2/2010 |
| WO | 2010086560 A2 | 8/2010 |
| WO | 2013050698 A1 | 4/2013 |

* cited by examiner

LEADING-EDGE DEVICE FOR AN AIRCRAFT

CROSS-REFERENCES TO RELATED APPLICATIONS

This application claims the benefit of the German patent application No. 102019111135.8 filed on Apr. 30, 2019, the entire disclosures of which are incorporated herein by way of reference.

FIELD OF THE INVENTION

The invention relates to a wing leading-edge device, a wing having a fixed wing body and a wing leading-edge device, as well as an aircraft.

BACKGROUND OF THE INVENTION

In commercial aircraft, the icing of wing components and control surfaces is often prevented by using deicing or anti-icing devices. A common approach to achieve this is to heat up respective parts with bleed air from turbofan engines. The deicing of slats may be complicated, since most of a slat body needs to be heated, even though an internal structure of the slat is often separated by a spar. Introducing the air with an elevated temperature heats up the slat but requires an exhaust of the bleed air from the slat body. As a back skin of a leading-edge slat typically follows the shape of a fixed leading edge of the wing, air that exits from the slat impinges the fixed leading edge. Hence, additional measures for protecting the fixed leading edge are required.

For example, state of the art slat designs provide two bay sections for anti-ice purposes. In the first bay, the hot air will be blown against the front skin. To hold the hot air as long as possible on the front skin, the hot air will be guided through acceleration slots into the second bay, which are located on the top skin. Due to the high speed, the air follows along an inner surface of the front skin up to a rear spar. The hot air will leave the slat through exhaust holes in the back skin. These exhaust holes usually face the fixed leading edge. The air then flows along the fixed leading edge down to the lower heel and then enters the outside air stream.

Alternative solutions, such as proposed in DE 10 2008 019 146 A1, include the use of air, which is heated by a component of an environmental control system, to the device to be protected from icing. In DE 10 2004 058 430 B4 it is proposed to use exhaust air from a fuel cell also for the purpose of icing protection. However, the temperature level may be lower than in a bleed air based system.

SUMMARY OF THE INVENTION

Consequently, it is an object to provide a leading-edge slat, which is configured to be heated through air at an elevated temperature, in particular through bleed air, while adverse effects to a fixed leading edge shall be avoided as much as possible.

A leading-edge device for an aircraft is proposed, the device comprising a flow body having a front skin, a back skin, a spar and an air inlet, wherein the front skin is curved around a spanwise axis to form a bottom section and a top section, wherein a leading edge of the flow body is arranged between the bottom section and the top section, and wherein the spar extends from the bottom section to the top section, wherein the front skin, the back skin and the spar enclose at least one air chamber that is in fluid communication with the air inlet, wherein an outlet portion is arranged at least directly adjacent to the bottom section of the front skin, and wherein the outlet portion comprises a plurality of air outlets for letting air from the at least one air chamber exhaust through the air outlets.

The front skin may comprise a strongly curved shape to serve as a high lift surface, such as a slat or a leading-edge flap. It comprises the leading edge, which may be located in the direct vicinity of the stagnation point. The front skin may be manufactured from a single, sheet-like material, such as a sheet of metal or a fiber-reinforced laminate. It may have a constant height or a variable height, depending on the respective design philosophy. The cross section of the front skin may somewhat resemble a U-shape, wherein both legs of the U-shape are considered the bottom section and the top section. In between, exemplarily near a region of the strongest curvature, the leading edge may be arranged. For providing a desired dimensional stability, a plurality of ribs may be distributed along the flow body. The front skin may be the part of the leading-edge region of a wing that is visible during cruise flight.

The spar is used for providing a mechanical stability. The spar may exemplarily be aligned in such a way, that it extends substantially parallel to a Z axis of the aircraft when the leading-edge slat is installed on a wing and is in a retracted position. The spar may comprise flanges that are joined to the bottom section as well as the top section. Depending on the material used for manufacturing the slat body, the spar may also be based on a sheet-like material, which may comprise cutouts for weight reduction. The spars may face in a backward or forward direction.

The air inlet may be arranged at a lateral side of the leading-edge device and allows to supply air at an elevated temperature into the at least one air chamber. In a basic embodiment, the air inlet may be an open end of a tube that extends along the leading-edge device. air outlets are in fluid communication with the at least one air chamber, such that air that enters the at least one air chamber is capable of exiting the same through the air outlets. Thus, a flow passage for air between the air inlet and the air outlets is created. By flowing through, the air heats up the leading-edge device and leads to prevention or removal of ice accumulation.

It may be beneficial to dimension the air outlets in a way that a slight pressure builds up inside the flow body. Further, the air outlets may be distributed substantially along the whole region of interest to be protected from icing. This allows to distribute the air inside the leading-edge device for an even temperature distribution. In case of multiple air chambers inside the flow body care should be taken in allowing a flow through all air chambers by providing certain cross-flow openings.

The leading-edge device according to the invention differs from known designs in the arrangement of the air outlets. The outlet portion comprises a plurality of air outlets for letting air from the at least one air chamber exhaust through the air outlets at least directly adjacent to the bottom section of the skin. In doing so, the air exits at a region very near to the bottom of the flow body. The exhaust air flow does not touch or hardly touches a fixed wing arranged behind the flow body. Exemplarily, the air outlets may be arranged directly adjacent the bottom section, such that air exits the air outlets and flows along the bottom section to leave the flow body at a bottom region to flow past the fixed leading edge. In another example, the air outlets may even extend through the bottom section, thereby leaving the flow body to flow past the fixed leading edge in a distance thereto.

In an advantageous embodiment, the air outlets extend through the front skin in the bottom section. For example, a lower flange of the spar may face in a forward direction and the air outlets are arranged behind the lower flange and extend through the front skin. Consequently, air may exit from the at least one air chamber into the environment directly into a region below the front skin. A contact of the hot air with a fixed leading edge behind the flow body is thereby clearly prevented. A longitudinal seal to be arranged between the leading-edge device and the fixed leading edge of the wing may be positioned lower down for reducing the loading due to a better pressure distribution.

In another advantageous embodiment, the air outlets also extend through a lower flange of the spar. Hence, the air outlets may extend through the lower flange and the front skin, to which the lower flange is attached. For example, the lower flange may face in a rearward direction rearward of the air outlets. Air from the at least one air chamber exits into the environment directly into a region below the front skin. The longitudinal seal, which is be arranged between the leading-edge device and the fixed leading edge of the wing, may also in this case be positioned lower down for reducing the loading due to a better pressure distribution.

Further advantageously, the air outlets are realized in the form of dimples in the bottom section of the back skin. The dimples can be realized as local protrusions in the back skin, which create a local flow channel each between the back skin and the spar and/or the front skin. Air can exit the at least one air chamber through entering an inner opening of these flow channels and flowing along the flow channels to an outer opening. The outer opening may be arranged in a distance to an adjacent component, such as a flange of the spar, or an inner side of the bottom section of the front skin In a preferred embodiment, the spar comprises a lower flange attached to the bottom section of the front skin, wherein the back skin is attached to the lower flange, such that the back skin and the bottom section enclose the lower flange, and wherein the lower flange comprises a plurality of slots extending underneath the front skin as the air outlets. Air exits from the at least one air chamber through the slots, which act as flow channels in fluid communication with both the environment and the at least one air chamber. By this arrangement, the flow resistance may be dimensioned within a large range, while the back skin and the spar may still be rigidly attached to the bottom section of the front skin. The hot air exiting the at least one air chamber is able to enter the outside airstream under reduction of the affected area of the fixed leading edge. A longitudinal seal between the leading-edge device and the fixed leading edge can be positioned in any position for reducing the loading due to a better pressure distribution.

In another advantageous embodiment, the back skin is attached to the spar, wherein a lower end edge of the back skin and the spar enclose a gap, and wherein the back skin comprises a plurality of dimples in fluid communication with the air inlet, wherein the dimples have lower openings that face into the gap and act as the air outlets. As mentioned above, individual flow channels are created by the dimples, through which air flows out of the at least one air chamber. Hot air can vent through those very close to the outside airstream under reduction of the affected area on the fixed leading edge. The benefit is that hot air is not at all affecting the fixed leading edge and a longitudinal seal between the leading-edge device and the fixed leading edge may be positioned lower down for reducing the loading due to a better pressure distribution.

Advantageously, the dimples may extend between the back skin and a part of the spar and comprise upper openings facing into the at least one air chamber. Thus, the dimples protrude in a backwards direction opposite the leading edge.

In another advantageous embodiment, the leading-edge device further comprises a girder attached to the spar and the back skin, wherein the girder comprises an upper edge in a distance to the front skin and a lower edge adjacent to the bottom section of the front skin, and wherein the girder comprises a plurality of slots extending between the upper edge and the lower edge, such that lower ends of the slots adjacent the bottom section form the air outlets. The slots may be formed as hollow spaces that extend inside the girder. Hence, a plurality of flow channels is provided by the girder extending between the at least one air chamber and the bottom section of the front skin.

Still further, the flow directions of the lower ends are arranged transverse to the girder. For example, the slots may end in a clear distance to a respective end surface of the girder and an outflow opening may be provided by an additional borehole extending perpendicular to the girder. This may exemplarily be parallel to the bottom section of the front skin. Hence, the flow direction of the air that flows out of the at least one air chamber changes along its course.

The air outlets may be designed to form an exhaust flow that is attached to and runs along the front skin in the bottom section. Consequently, the exhaust flow runs at a lowermost position of the flow body and thus clearly reduces an impact region with a fixed leading edge.

The invention further relates to a wing for an aircraft, having a fixed leading edge and a leading-edge device according to the above description, wherein the leading-edge device is movable between a retracted position directly forward of the fixed leading-edge and at least one extended position at a further distance to the fixed leading edge.

In such a wing, the air outlets are designed to exhaust the air in a region in front of a lowermost part of the fixed leading edge in the retracted position the leading-edge device.

Furthermore, the air outlets may be arranged in front of the fixed leading edge.

Lastly, the invention relates to an aircraft having at least one wing according to the above description, wherein the air inlet is in fluid communication with a source of heated air.

The aircraft may further comprise at least one turbofan engine having at least one bleed air port, wherein the air inlet is in fluid communication with the at least one bleed air port, such that bleed air delivered by the at least one turbofan engine is the source of heated air.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION OF THE PREFERRED EMBODIMENTS

Figure 1:
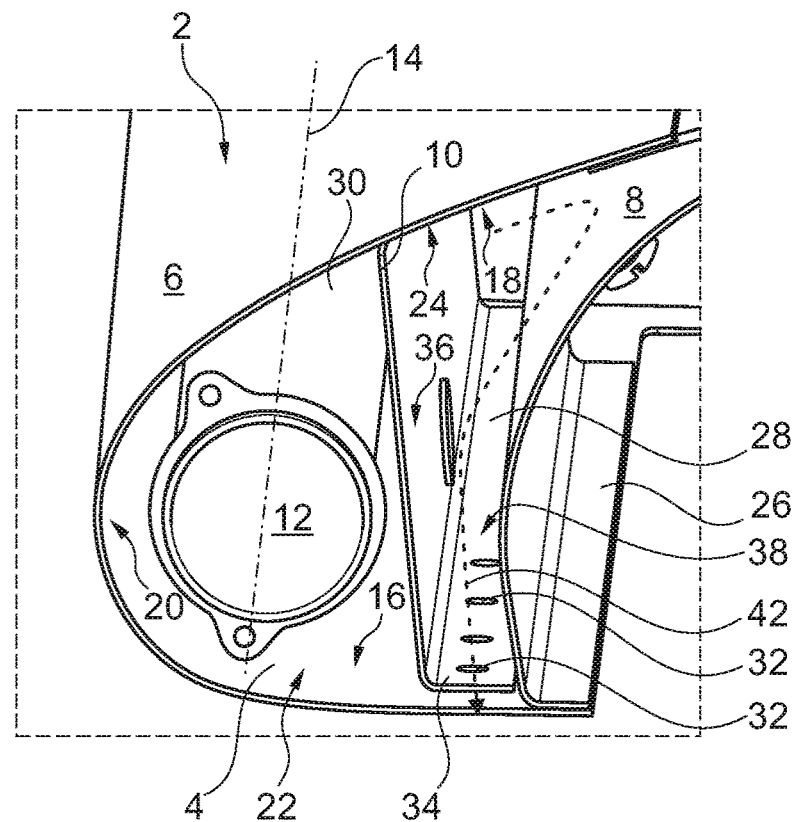
FIGS. 1 and 2 show a first exemplary embodiment of a leading-edge device with outlets extending through the bottom section of the front skin in two different viewing directions.

FIG. 1 shows a leading-edge device 2 for an aircraft in a first exemplary embodiment. The device 2 comprises a flow body 4 having a front skin 6, a back skin 8, a spar 10 and an air inlet 12. The front skin 6 is curved around a spanwise axis 14 to form a bottom section 16 and a top section 18. A leading edge 20 is arranged between the bottom section 16 and the top section 18 and extends in a spanwise direction. The spar 10 extends between the bottom section 16 and the top section 18 and is connected to the front skin 6 in both sections 16 and 18. By arranging the spar 10 in this manner, a first air chamber 22 is created between the spar 10 and the front skin 6, which first air chamber 22 is located in front of the spar 10, i.e., adjacent the leading edge 20.

The spar 10 comprises an upper flange 24, which is arranged to be parallel to the top section 18 of the front skin 6. Behind the upper flange 24, the back skin 8 is coupled with the front skin 6. Opposite to the upper flange 24, a lower flange 34 of the spar 10 is provided, which is coupled with the bottom section of the front skin 6. Hence, the spar 10 is arranged to extend between the bottom section 16 and the top section 18. The back skin 8, in turn, is arranged at a side of the spar 10 that is opposite the leading edge 20. It may comprise a bottom flange 26, which is also coupled with the bottom section 16 of the front skin 6. The back skin 8 is also curved around the spanwise axis 14 or an axis parallel thereto and encloses a second air chamber 28 with the front skin 6 and the spar 10.

In this exemplary embodiment, the air inlet 12 is a part of a tubular member 30, through which air can flow into the first air chamber 22. By using air that has an elevated temperature, the first air chamber 22, and thus a respective part of the front skin 6, is heated up and ice accumulations on the front skin 6 around the leading edge 20 can be prevented or removed. By providing a fluid communication between the first air chamber 22 and the second air chamber 28, air is forced to flows into the second air chamber 28 to also heat up a rear part of the flow body 4. From there, the air is allowed to exit the flow body 4. For this, several air outlets 32 are provided that extend through the spar 10 and the bottom section 16 of the front skin 6. The resulting air flows are substantially perpendicular to the front skin 6 in this region.

The spar 10 comprises a lower flange 34 that is arranged at an angle to a main part 36 of the spar 10 and rests flushly on the front skin 6 in the bottom section 16. Hence, the air outlets 32 extend through two material layers. While the air outlets 32 are provided in the form of slots in the lower flange 34, they may comprise a different shape in the front skin 6. In the following, the region or portion of the flow body 4 where the air exits the flow body 4 is referred to as outlet portion 38. By placing the outlet portion 38 in the bottom section 16 of the front skin 6, air exits the flow body 4 in a manner that prevents hot air to impinge a fixed leading edge of the wing (not shown), to which the leading-edge device 2 is attached.

Figure 2:
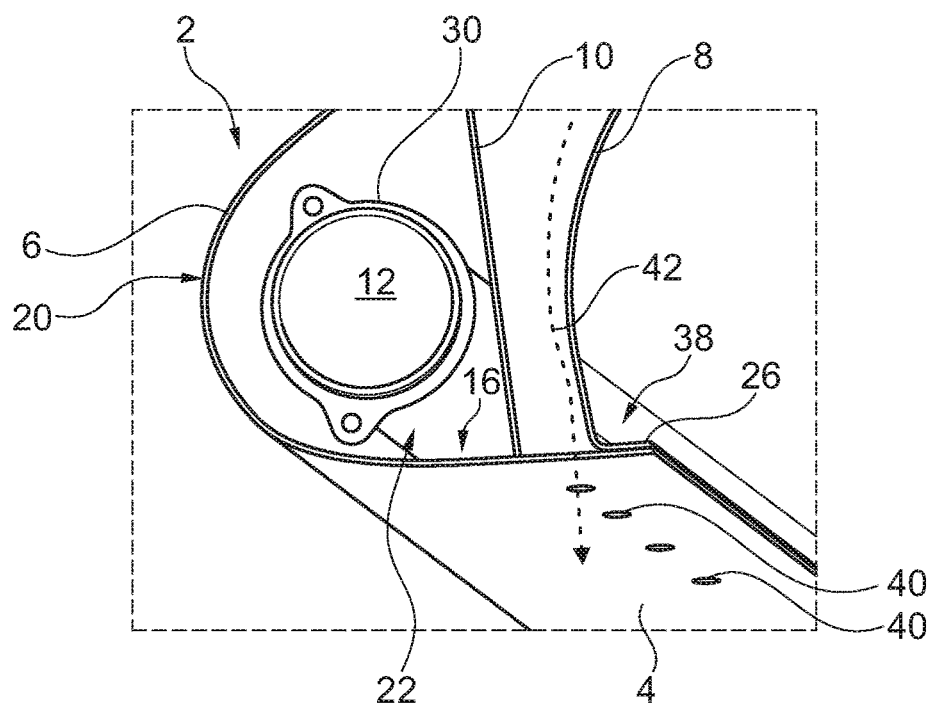

In FIG. 2 another viewing direction is chosen and lower ends 40 of the air outlets 32 are shown. The lower ends 40 may comprise a circular shape. It is clearly apparent that an airflow 42 is routed from the second air chamber 28 through the air outlets 32 in a direction perpendicular to the bottom section 16 at the outlet portion 38.

As described further above, the lower flange 34 may also face in a forward direction, such that the air outlets 32 only extend through the front skin 6 in the bottom section 16.

Figure 3:
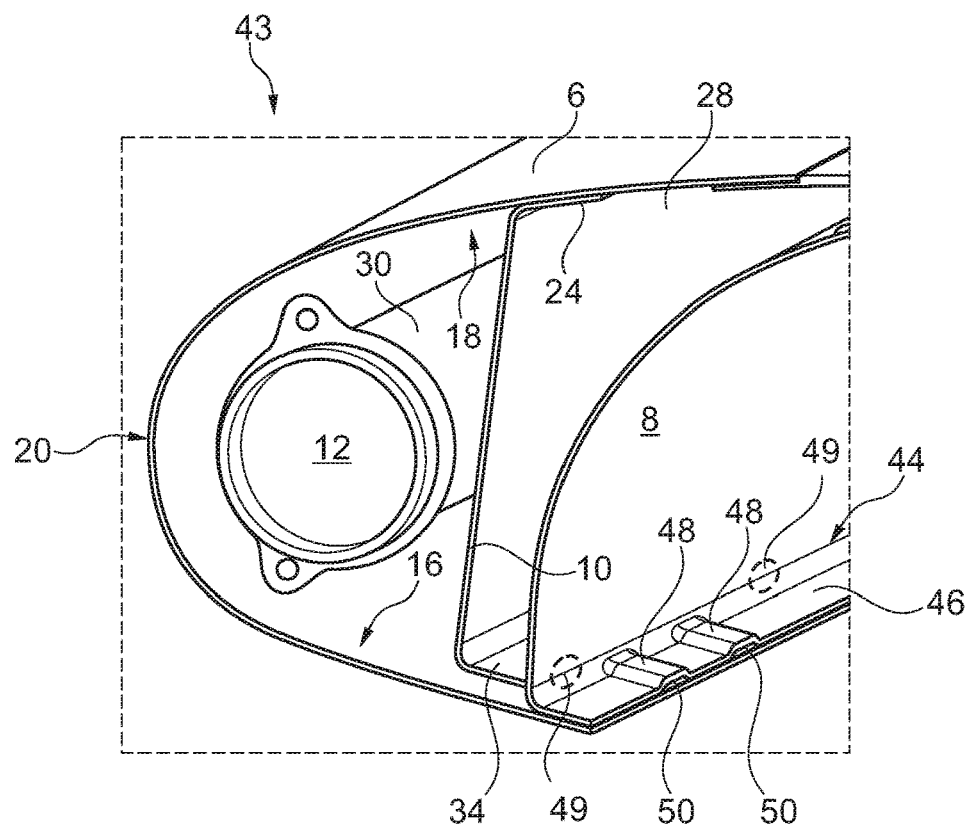
FIGS. 3 and 4 show a second exemplary embodiment of a leading-edge device with dimples in the back skin in two different viewing directions.
Figure 4:
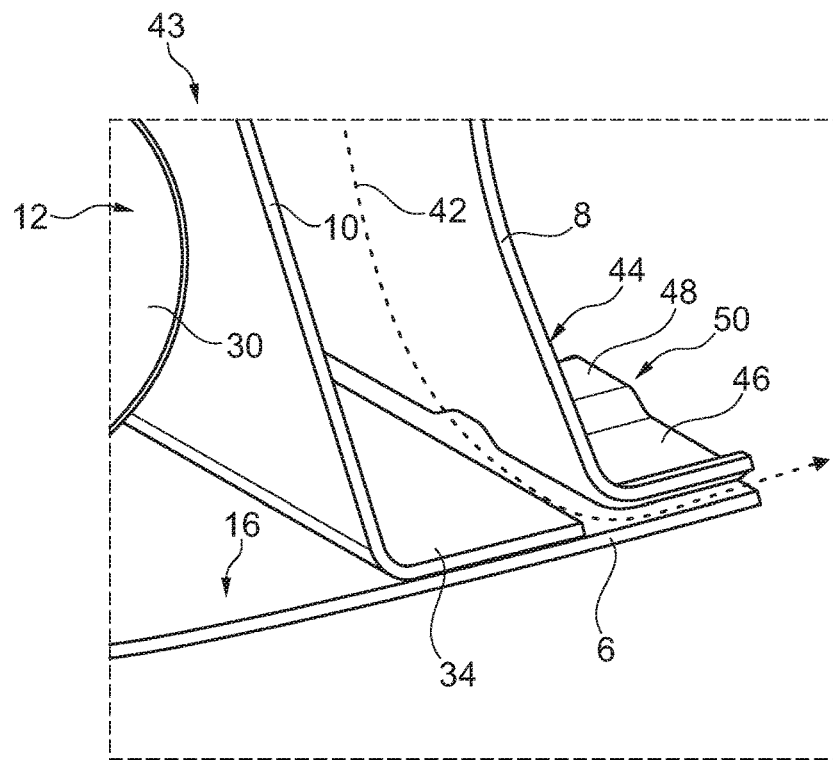

In FIGS. 3 and 4, another exemplary embodiment in the form of a leading-edge device 43 is shown. While the basic arrangement is similar to the leading-edge device 2 of FIGS. 1 and 2, a different outlet portion 44 is created. Here, the back skin 8 comprises a lower flange 46, which comprises several dimples 48 that bulge away from the front skin 6 in the bottom section 16. Each dimple creates a flow channel between the front skin 6 and the back skin 8 in fluid communication with the second air chamber 28. The outer ends of the flow channels opposite to the second air chamber 28 thus create air outlets 50. Due to the given shape an orientation of the dimples, air that exits the second chamber 28 leaves the leading-edge device 43 in a direction parallel to the bottom section 16 of the front skin 6.

This is further shown in FIG. 4 from another viewing direction. Here, the dimples 48 are offset to the lower flange 34 of the spar 10 and allow an airflow 42 to change its direction to flow along the bottom section 16 towards the air outlets 50.

Instead of dimples, also simple holes 49 (shown in dashed lines) may be arranged in the back skin 8 and act as air outlets. It is reasonable to place these holes 49 as close to the lower flange 46 or the lower end of the back skin 8 as possible. When using the holes 49 as shown, at least the lower flange 46 may be designed more simply.

Figure 5:
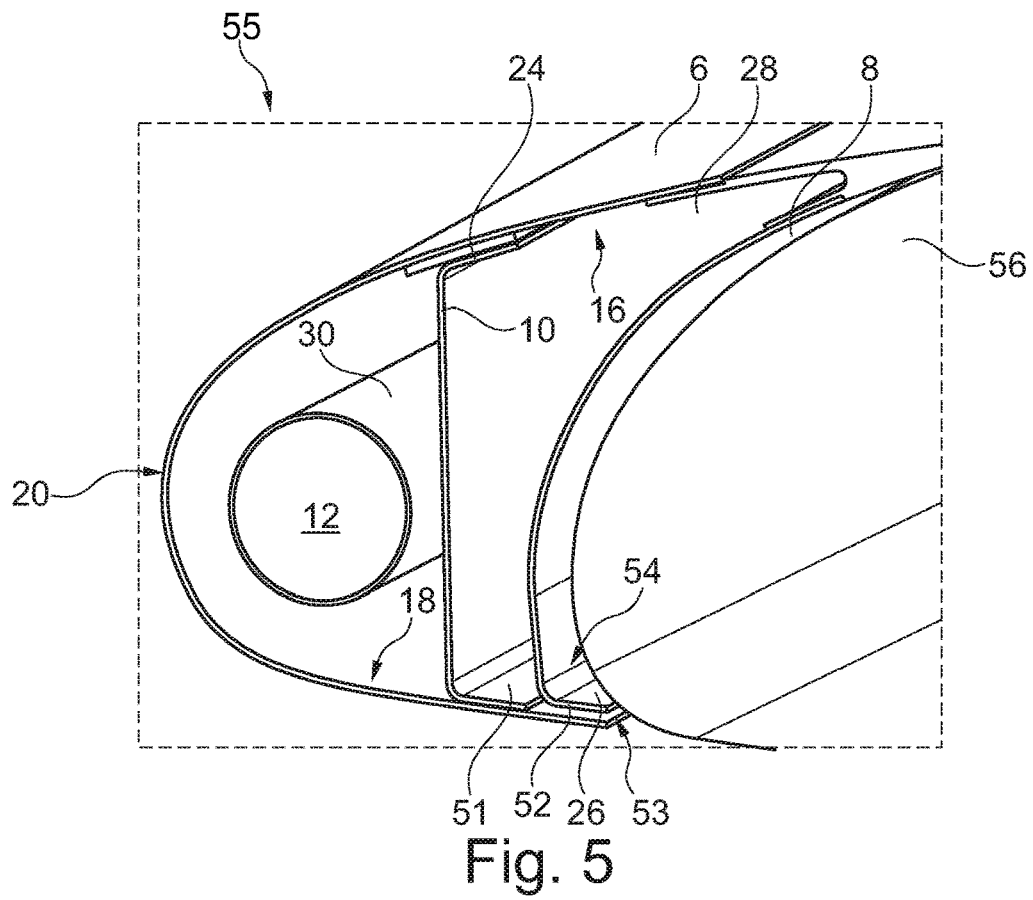
FIGS. 5 and 6 show a third exemplary embodiment of a leading-edge device with slots in a flange of the spar in two different viewing directions.
Figure 6:
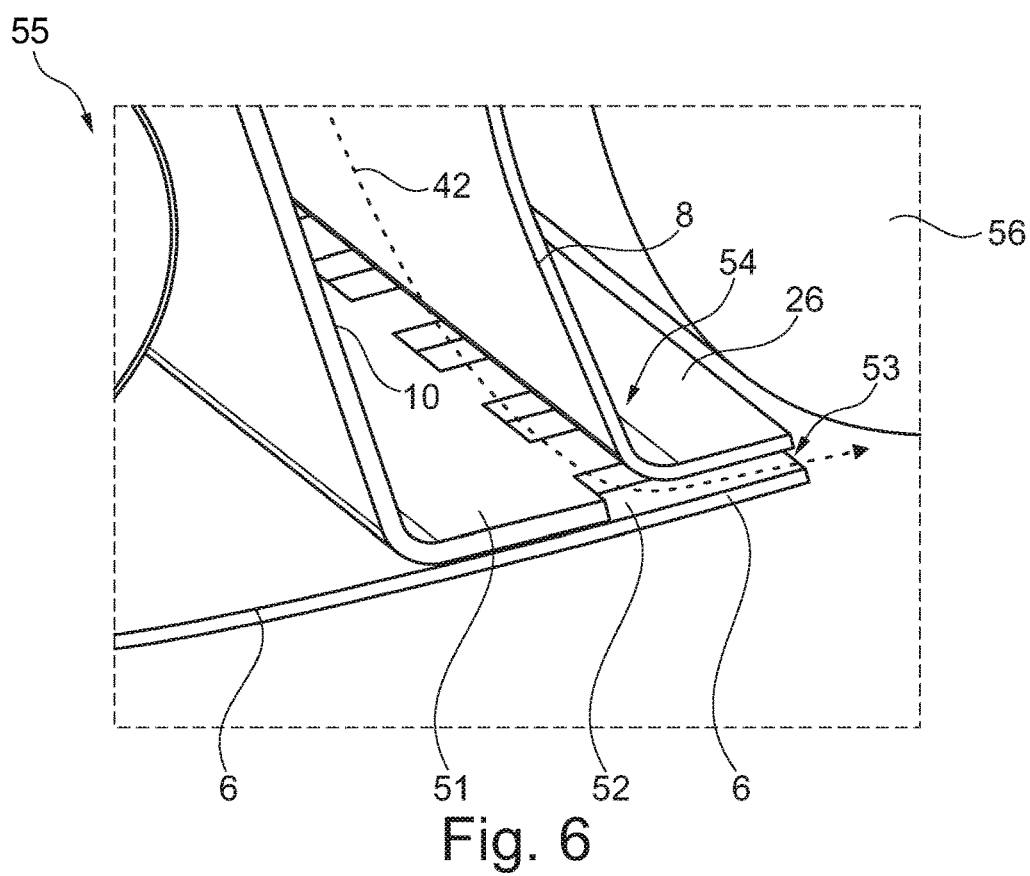

FIGS. 5 and 6 show another exemplary embodiment in form of a leading-edge device 55. Here, the spar 10 comprises a lower flange 51, which is attached to the bottom section 16 of the front skin 6. The bottom flange 26 of the back skin 8 is attached to a top side of the lower flange 51. The lower flange 51 comprises a plurality of slots 52 that extend from the second air chamber 28 underneath a chordwise extension of the bottom flange 26 of the back skin 8 and thus provide flow channels both in fluid communication with the second air chamber 28 and the environment. Hence, an outlet portion 54 is created, through which air leaves the second air chamber 28. The air flows through the slots 52, wherein distal ends 53 of the slots 52 opposite the spar 10 act as air outlets leading the air into the environment.

Figure 7:
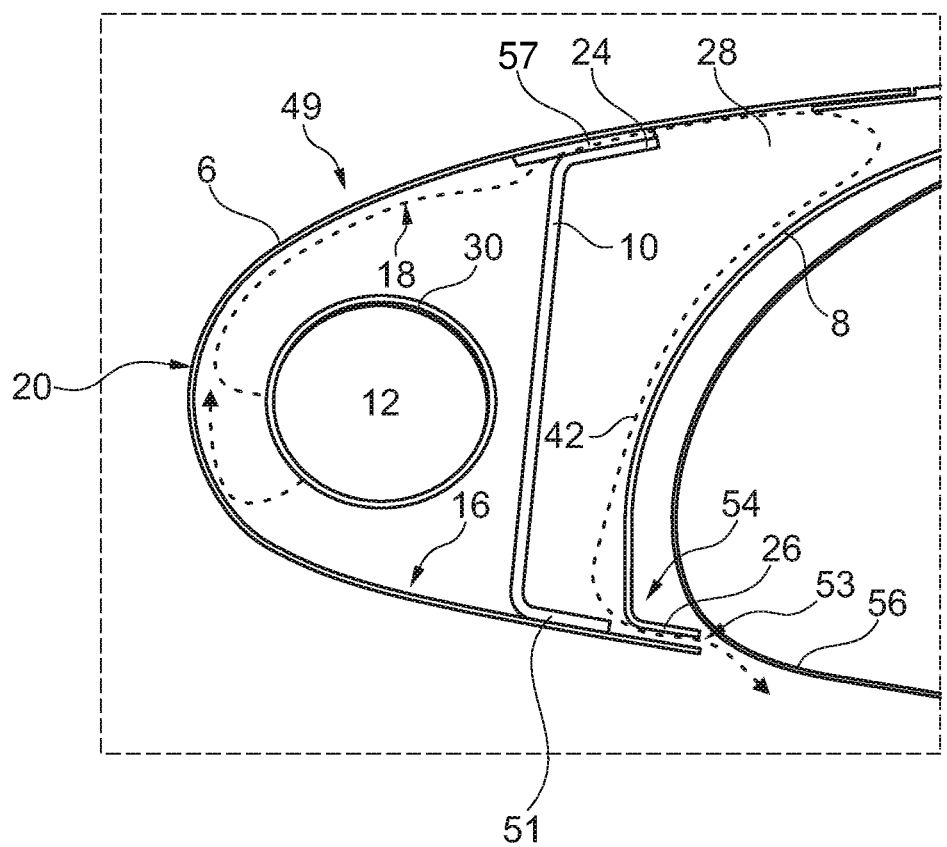
FIG. 7 shows a schematic view of the air flow in the third exemplary embodiment.

In FIG. 7, a resulting air flow in the device 55 according to FIGS. 5 and 6 is schematically shown. Here, air enters the tubular member 30 through the air inlet 12 and afterwards exits the tubular member 30 through a plurality of openings (not shown) to impinge onto an inner side of the front skin 6. The air flows through a passage 57 into the second chamber 28 and is thus directed to the outlet portion 54. From there, it exits the leading-edge device 55 and flows into the environment away from a fixed leading edge 56. The air flow 42 hardly touches the fixed leading edge 56.

Figure 8:
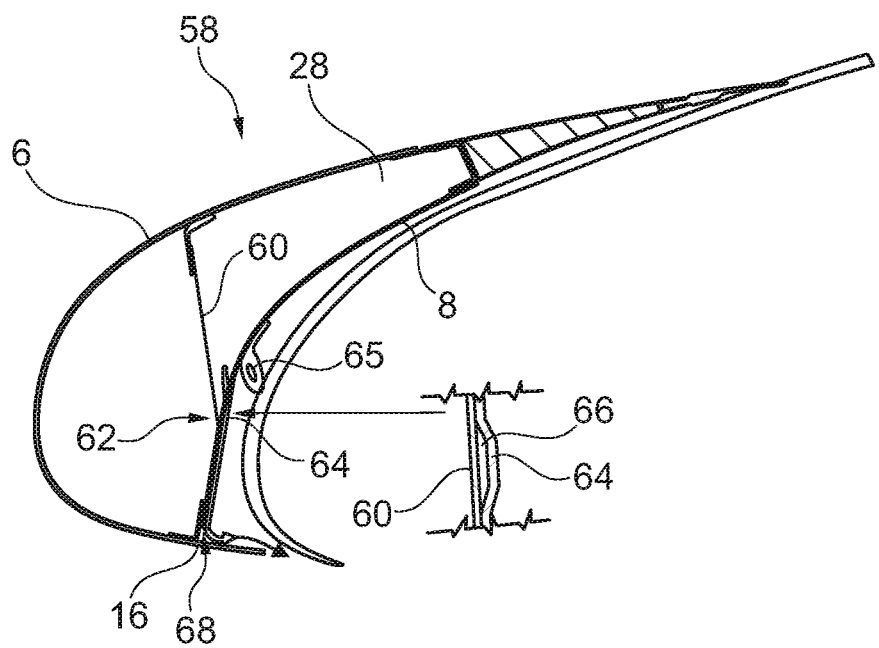
FIG. 8 shows a fourth exemplary embodiment of a leading-edge device with a dimple in the back skin.

FIG. 8 shows a further exemplary embodiment in the form of a leading-edge device 58 with a spar 60 that comprises a kink 62, which substantially extends in a spanwise direction. The back skin 8 is attached to the spar 60 and comprises several dimples 64 that form individual flow channels 66, which are in fluid communication with both the second air chamber 28 and the environment. The flow channels 66 extend along the spar 60 towards the bottom section 16 of the front skin 6.

The back skin 8 and, consequently, the flow channels 66 end at a slight distance from the bottom section 16 of the front skin 6. This allows air to exit from the flow channels 66 in a direction perpendicular to the bottom section 16 through air outlets 68 in the form of open ends of the flow channels 66. By impinging the bottom section 16, the air flow is bent to flow along the bottom section 16 in a backwards direction substantially chordwise. A detail in FIG. 8 shows a section A-A through the spar 60 and a dimple 64. As an example, the dimple 64 creates a flow channel 66 with a trapezoidal cross-section.

A longitudinal seal 65 is arranged between the flow body 4 and the fixed leading edge 56. The seal 65 is arranged directly above the dimples 64.

Figure 9:
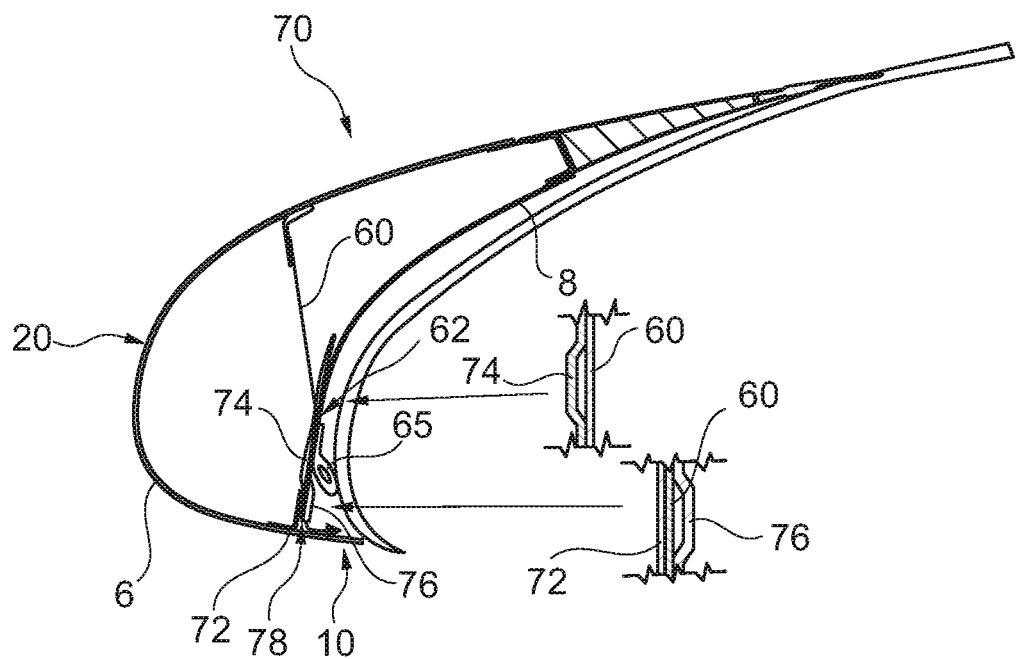
FIG. 9 shows a fifth exemplary embodiment of a leading-edge device with dimples in a girder and a back skin.

FIG. 9 shows a leading-edge device 70, which has some similarities with the device 58 of FIG. 8. Here, a lower girder 72 is provided, to which the spar 60 is attached. The spar 60 has several dimples 74 in a section between the kink 62 and the girder 72, wherein the dimples 74 bulge into the direction of the leading edge 20. In a region behind the girder 72, the back skin 8 has associated dimples 76, which face away from the leading edge 20 and are arranged behind the girder 72. Similar to FIG. 8, the back skin 8 ends at a distance from the bottom section 16 of the front skin 6 to form an air outlet 78. The longitudinal seal 65 can be arranged above the dimples 76, which is below the position possible in the exemplary embodiment of FIG. 9.

Figure 10:
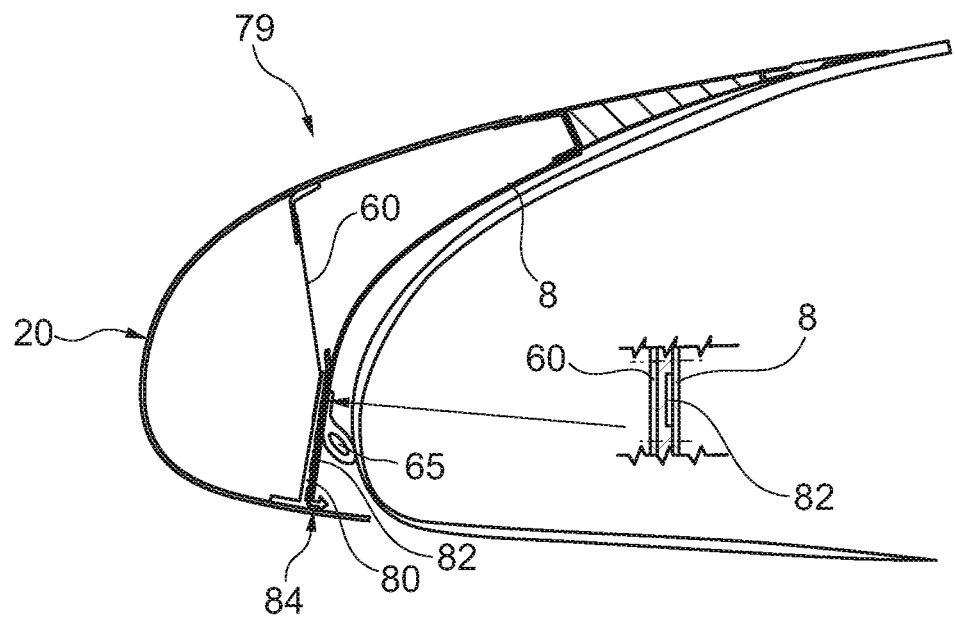
FIG. 10 shows a sixth exemplary embodiment of a leading-edge device with a slot in a girder.

FIG. 10 shows a further leading-edge device 79 having a lower girder 80, which comprises an internal air channel 82, which is open at a side facing away from the leading edge 20 form an air outlet 84. Here, the longitudinal seal 65 is arranged approximately in a position comparable to the position in FIG. 9.

Figure 11:
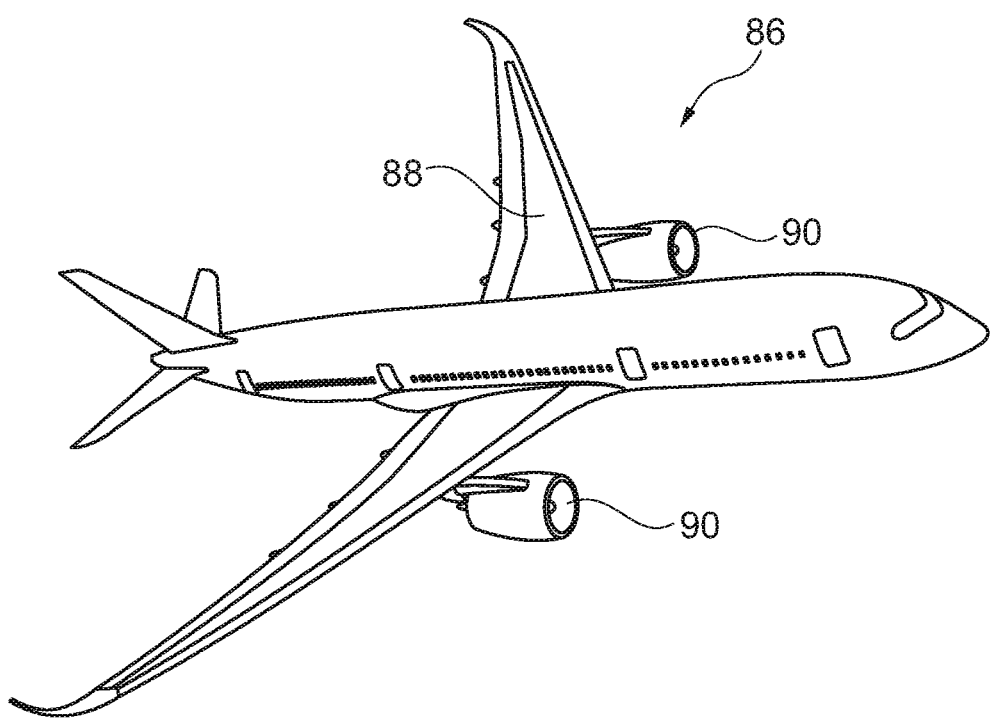
FIG. 11 shows an aircraft having at least one leading-edge device.

Finally, FIG. 11 shows aircraft 86 having wings 88, which exemplarily comprise at least one leading-edge device 2. However, the other leading-edge devices 43, 58 or 70 may also be arranged on the wings 88 as an alternative or as an addition. The aircraft 86 further comprises engines 90, which are exemplarily realized as turbofan engines. They comprise bleed air ports (not shown), which may deliver air at an elevated temperature to the leading-edge device 2.

In addition, it should be pointed out that characteristics or steps which have been described with reference to one of the above exemplary embodiments may also be used in combination with other characteristics or steps of other exemplary embodiments described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 leading-edge device
4 flow body
6 front skin
8 back skin
10 spar
12 air inlet
14 spanwise axis
16 bottom section
18 top section
20 leading edge
22 first air chamber
24 upper flange of spar
26 bottom flange of back skin
28 second air chamber
30 tubular member
32 air outlet
34 lower flange of spar
36 main part of spar
38 outlet portion
40 lower end of air outlet 32
42 airflow
43 leading-edge device
44 outlet portion
46 lower flange of back skin
48 dimple
49 hole/air outlet
50 air outlet
51 lower flange of spar
52 slot
53 air outlet/distal end
54 outlet portion
55 leading-edge device
56 fixed leading edge
57 passage
58 leading-edge device
60 spar
62 kink
64 dimple
65 seal
66 flow channel
68 air outlet
70 leading-edge device
72 lower girder
74 dimple
76 dimple
78 air outlet
79 leading-edge device
80 girder
82 air channel
84 air outlet
86 aircraft
88 wing
90 engine

The invention claimed is:

1. A leading-edge device for an aircraft, comprising a flow body having a front skin, a back skin, a spar and an air inlet,
wherein the front skin is curved around a spanwise axis to form a bottom section and a top section,
wherein a leading edge of the flow body is arranged between the bottom section and the top section, wherein the spar extends from the bottom section to the top section, wherein the front skin, the back skin and the spar enclose at least one air chamber that is in fluid communication with the air inlet, wherein an outlet portion is arranged at least directly adjacent to the bottom section of the front skin, and wherein the outlet portion comprises a lower flange of the spar extending into the at least one air chamber and a plurality of air outlets for letting air from the at least one air chamber exhaust through the air outlets, wherein each of the plurality of air outlets comprises an aperture in the lower flange such that an airflow is routed from the at least one chamber through the air outlets.

2. The leading-edge device according to claim 1, wherein the air outlets extend through the front skin in the bottom section.

3. A leading-edge device for an aircraft, comprising a flow body having a front skin, a back skin, a spar and an air inlet, wherein the front skin is curved around a spanwise axis to form a bottom section and a top section, wherein a leading edge of the flow body is arranged between the bottom section and the top section, wherein the spar extends from the bottom section to the top section, wherein the front skin, the back skin and the spar enclose at least one air chamber that is in fluid communication with the air inlet, wherein an outlet portion is arranged at least directly adjacent to the bottom section of the front skin, wherein the outlet portion comprises a plurality of air outlets for letting air from the at least one air chamber exhaust through the air outlets, wherein the spar comprises a lower flange attached to the bottom section of the front skin, wherein the back skin is attached to the lower flange, such that the back skin and the bottom section enclose the lower flange, wherein the lower flange comprises a plurality of slots extending underneath the back skin as the air outlets.

4. A leading-edge device for an aircraft, comprising a flow body having a front skin, a back skin, a spar and an air inlet, wherein the front skin is curved around a spanwise axis to form a bottom section and a top section, wherein a leading edge of the flow body is arranged between the bottom section and the top section, wherein the spar extends from the bottom section to the top section, wherein the front skin, the back skin and the spar enclose at least one air chamber that is in fluid communication with the air inlet, wherein an outlet portion is arranged at least directly adjacent to the bottom section of the front skin, wherein the outlet portion comprises a plurality of air outlets for letting air from the at least one air chamber exhaust through the air outlets, wherein the back skin is attached to the spar, wherein a lower end edge of the back skin and the spar enclose a gap, wherein the back skin comprises a plurality of dimples in fluid communication with the air inlet, wherein the dimples have lower openings that face into the gap and act as the air outlets.

5. The leading-edge device according to claim 4, wherein the dimples extend between the back skin and a part of the spar and comprise upper openings facing into the at least one air chamber.

6. A leading-edge device for an aircraft, comprising a flow body having a front skin, a back skin, a spar and an air inlet, wherein the front skin is curved around a spanwise axis to form a bottom section and a top section, wherein a leading edge of the flow body is arranged between the bottom section and the top section, wherein the spar extends from the bottom section to the top section, wherein the front skin, the back skin and the spar enclose at least one air chamber that is in fluid communication with the air inlet, wherein an outlet portion is arranged at least directly adjacent to the bottom section of the front skin, wherein the outlet portion comprises a plurality of air outlets for letting air from the at least one air chamber exhaust through the air outlets, and further comprising a girder attached to the spar and the back skin, wherein the girder comprises an upper edge in a distance to the front skin and a lower edge adjacent to the bottom section of the front skin, and wherein the girder comprises a plurality of slots extending between the upper edge and the lower edge, such that lower ends of the slots adjacent the bottom section form the air outlets.

7. The leading-edge device according to claim 6, wherein flow directions of the lower ends are arranged transverse to the girder.

8. The leading-edge device according to claim 1, wherein the air outlets are configured to form an exhaust flow that is attached to and runs along the front skin in the bottom section.

9. A wing for an aircraft, having a fixed leading edge and a leading-edge device according to claim 1, wherein the leading-edge device is movable between a retracted position directly forward of the fixed leading edge and at least one extended position at a further distance to the fixed leading edge.

10. The wing of claim 9, wherein the air outlets are configured to exhaust the air in a region in front of a lowermost part of the fixed leading edge in the retracted position the leading-edge device.

11. The wing of claim 9, wherein the air outlets are arranged in front of the fixed leading edge.

12. An aircraft having at least one wing of claim 9, wherein the air inlet is in fluid communication with a source of heated air.

13. The aircraft of claim 12, further comprising at least one turbofan engine having at least one bleed air port, wherein the air inlet is in fluid communication with the at least one bleed air port, such that bleed air delivered by the at least one turbofan engine is the source of heated air.

* * * * *